Patented Feb. 11, 1947

2,415,785

UNITED STATES PATENT OFFICE 2,415,785

UNSYMMETRICALLY SUBSTITUTED PIPERAZINES

Johannes S. Buck, East Greenbush, and Richard Baltzly, New York, N. Y., assignors to Burroughs Wellcome & Co. (U. S. A.) Inc., New York, N. Y., a corporation of New York No Drawing Application February 24, 1943, Serial No. 476,914

4 Claims. (Cl. 260—268)

This invention relates to N-monosubstituted and N,N'-unsymmetrically disubstituted piperazines and has for an object to provide new compositions of the above type and a novel and improved method of making the same.

Another object is to provide a method of making and isolating the above substances which is suitable for commercial operation.

The main difficulty involved in preparing monosubstituted piperazines, from which unsymmetrically disubstituted derivatives can also be obtained, resides in the isolation of the substance from the unreacted piperazine and the disubstituted piperazine which are present and which in many cases have similar boiling points. Amines are extremely hard to separate by fractional distillation unless their boiling points are widely separated. Furthermore, the classical methods of separating secondary from tertiary amines are of no avail in this case, since a monosubstituted piperazine reacts as both a secondary and a tertiary amine.

In accordance with the present invention we have found that this difficulty can be overcome by treating the piperazine with an aralkyl halide to form mixtures which contain, in addition to unreacted piperazine and symmetrically diaralkyl substituted piperazine, considerable quantities of a mono-aralkyl substituted piperazine having a relatively high stability and a boiling point or solublity differing by a substantial amount from the corresponding properties of the other reaction products, so that it can be readily separated by fractional distillation or by selective solution. After separation, if an unsymmetrically disubstituted piperazine is desired, the second substituent is introduced onto the second nitrogen atom.

As an example piperazine or its hexahydrate, dissolved in a suitable solvent may be reacted with an aralkyl halide, e. g. benzyl chloride p-chlorobenzyl chloride, anisyl chloride, or a phenethyl halide to form the corresponding N-aralkyl piperazine salt. The solvent may be removed, the water soluble unreacted piperazine, after basification, removed in water solution, and the remainder may be distilled in vacuo to separate the N-aralkyl piperazine. Alternatively, if the solvent during the reaction be absolute alcohol and the piperazine be itself anhydrous, the bulk of the dibenzyl piperazine formed as a by-product separates as its dihydrochloride towards the end of the reaction and can be removed, thus simplifying the ensuing distillation of mono-aralkyl piperazine.

The following compounds exemplify monosubstituted piperazines which may be obtained in this manner:

Mono-N-benzyl piperazine
Mono-N-p-chlorobenzyl piperazine
Mono-N-anisyl piperazine
Mono-N-phenethyl piperazine The separated mono-N-aralkyl piperazine may then be treated with a reagent capable of reacting with the second nitrogen atom to introduce the desired second substituent (R') and form N-aralkyl, N'-R-piperazine.

By suitable variation of the above process the following groups may be introduced onto the N' as the R' above referred to: alkyl, and aralkyl, different from the one present in the monosubstituted compound phenacyl or substituted phenacyl, hydroxyphenalkyl, carbamido or substituted carbamido, carbamidino or acyl.

A specific advantage of the process, according to the present invention, is that it is possible, in this precess to produce N—R—N'—R' disubstituted piperazines in which R is an aralkyl and R' is a highly sensitive acyl derivative, such as, for instance nitro-benzoyl.

The following are specific examples:

N-benzyl-N' methyl piperazine
N-phenethyl-N' ethyl piperazine
N-anisyl - N'-(3,4-dihydroxy-phenacyl) piperazine
N-anisyl - N' - (beta-3,4-dihydroxyphenyl-beta-hydroxy ethyl) piperazine
N-ainsyl-N'-carbamido piperazine
N-anisyl-N'-phenylcarbamido piperazine
N-benzyl-N'-carbamidino piperazine
N-benzyl-N'-acetyl piperazine
N - p-chlorobenzyl-N'-p-nitrobenzoyl piperazine
N-phenethyl-N'-propionyl piperazine
N-anisyl-N'-p-aminobenzoyl piperazine The process may be carried out as follows:

EXAMPLE 1

Piperazine hexahydrate was dissolvel in absolute ethanol and benzyl chloride added with stirring. After standing overnight the alcohol was distilled off and the residue partitioned between ether and sodium hydroxide solution. The greater part of the unreacted piperazine remained in the aqueous layer. The etheral layer was dried over $K_2CO_3$ and distilled in vacuo to separate pure monobenzyl piperazine from the dibenzyl piperazine.

The monobenzyl piperazine was methylated by the procedure of Clarke, Gillespie and Weisshauss (J. Amer. Chem. Soc., 55, 4571 (1933)), and the product, after liberation of the base was treated with benzoyl chloride to remove any monobenzyl piperazine that had remained unreacted. Basic material was again liberated with alkali and distilled in vacuo. The product, N-benzyl-N'-methyl piperazine, was crystallized as the dihydrochloride from absolute alcohol-ether mixture.

EXAMPLE 2

N - anisyl-N'-(beta-3,4-dihydroxyphenyl-beta-hydroxyethyl) piperazine may be prepared as follows:

Anisyl chloride ($CH_3.C_6H_4.CH_2Cl$) (1 mol) (from anisyl alcohol ($CH_3O.C_6H_4.CH_2OH$) and hydrogen chloride) was reacted with piperazine (1 mol) in absolute alcohol solution. The bulk of the dianisyl piperazine formed as a by-product separated towards the end of the reaction as its dihydrochloride and was filtered off. The solvent was evaporated from the filtrate, the residue diluted with water, basified and the anisyl piperazine extracted with ether. The small amount of impurities remaining was separated by vacuum distillation.

The mono-anisyl piperazine so produced was treated with chloro-acetocatechol forming N-anisyl-N' - (3,4 - dihydroxyphenacyl) piperazine which was isolated as its dihydrochloride. This in turn was hydrogenated catalytically at room temperature with a platinum catalyst giving the desired product.

EXAMPLE 3

*N-benzyl-N'-carbamidino-piperazine*

N-benzyl piperazine (Example 1) was warmed in dilute alcoholic solution with S-methyl isothiourea hydro-iodide. Methyl mercaptan was evolved and from the solution, on evaporation and addition of acetone, N-benzyl-N'-carbamidino piperazine hydroiodide crystallized. It was purified by crystallization from aqueous acetone.

EXAMPLE 4

*N-anisyl-N'-p-aminobenzoyl piperazine*

N-anisyl piperazine (Example 2) was reacted in benzene with p-nitrobenzoyl chloride. The resulting compound, N-anisyl-N'-p-nitrobenzoyl piperazine hydrochloride separated and was recrystallized from alcohol. On catalytic hydrogenation in alcoholic solution at room temperature with a platinum catalyst, the nitro group was reduced to an amino group and the N-anisyl-N'-p-aminobenzoyl piperazine was isolated as its dihydrochloride. It is to be noted that more drastic conditions of reduction here and in Example 2 would cause elimination of the anisyl group, but there is no difficulty in arresting the reduction after the very rapid reduction of the nitro group is completed.

It is to be understood that specific examples have been set forth for purposes of illustration only and that various substitutions and modifications may be made as will be apparent to a person skilled in the art.

What is claimed is:

1. In a method of preparing substituted piperazines, the steps of treating piperazine with an aralkyl halide to form a reaction mixture containing, in addition to unreacted piperazine and di-N-substituted piperazine, a substantial amount of mono-N-aralkyl substituted piperazine, separating the mono-N-substituted piperazine from the unreacted piperazine and from the disubstituted piperazine, and recovering said monosubstituted piperazine.

2. In a method of preparing substituted piperazines, the steps of treating piperazine with an aralkyl halide to form a reaction mixture containing, in addition to unreacted piperazine and di-N-substituted piperazine, a substantial amount of mono-N-aralkyl substituted piperazine, separating the mono-N-substituted piperazine from the unreacted piperazine and from the disubstituted piperazine by fractional distillation, and recovering said monosubstituted piperazine.

3. A method of preparing unsymmetrically disubstituted piperazines, comprising the steps of treating piperazine with an aralkyl halide to form a reaction mixture containing, in addition to unreacted piperazine and di-N-substituted piperazine, a substantial amount of mono-N-aralkyl substituted piperazine, separating the mono-N-substituted piperazine from the unreacted piperazine and from the disubstituted piperazine, and then introducing on to the second unreacted nitrogen atom of the monosubstituted compound a second substituent different from the aralkyl in the monosubstituted compound, said second substituent being a monovalent radical selected from the group consisting of alkyl, aralkyl, phenacyl and substituted phenacyl, hydroxyphenalkyl, carbamido and substituted carbamido, carbamidino and acyl.

4. N-anisyl- N' - (beta - 3,4 - dihydroxyphenyl-beta-hydroxy ethyl) piperazine.

JOHANNES S. BUCK.
RICHARD BALTZLY.

REFERENCES CITED

The following references are of record in the file of this patent:

FOREIGN PATENTS

| Number | Country | Date |
|--------|---------|------|
| 698,687 | French | Feb. 3, 1931 |
| 98,031 | German | June 1898 |

OTHER REFERENCES

Beilstein XXIII, page 11. (Copy in Div. 6.)
Chem. Abstracts, vol. 29, pages 2959, 4013.
Chem. Abstracts, vol. 33, page 2897.
Journal Organic Chemistry, vol. 8, pages 338–41.
Collection Czechoslov Chem. Communications, vol. 7, pages 93–102.
Arhiv. Hem. Farm., vol. 11, pages 99–123.
Groggins, "Unit Processes in Organic Synthesis," McGraw Hill, N. Y., 1938, page 489. (Copy in Div. 59.)
Beilstein, vol. XXIII, pages 5 and 9. (Copy in Div. 6.)
Berichte, vol. 29, page 2384.
Centralblatt, 1898, I, page 380.
Berichte, vol. 24, page 3240.
Journal Chem. Soc. (London), 1929, pages 39–46.
Journal Amer. Chem. Soc., Feb. 1944, page 263.